United States Patent [19]

Eccardt

[11] Patent Number: 4,677,920
[45] Date of Patent: Jul. 7, 1987

[54] ADJUSTABLE SIDE EXTENSIONS FOR WORK TABLE

[75] Inventor: Curtis J. Eccardt, St. Charles County, Mo.

[73] Assignee: Emerson Electric Co., St. Louis, Mo.

[21] Appl. No.: 740,759

[22] Filed: Jun. 3, 1985

[51] Int. Cl.⁴ .............................................. A47B 1/04
[52] U.S. Cl. ...................................... 108/69; 108/64; 108/65; 108/152
[58] Field of Search ....................... 108/69, 64, 65, 89, 108/152, 54.1; 403/292, 293, 401, 339; 248/558, 916

[56] References Cited

U.S. PATENT DOCUMENTS

| | | | |
|---|---|---|---|
| 177,911 | 5/1876 | Wolf | 108/69 |
| 534,732 | 2/1895 | Titcomb | 403/339 |
| 2,328,051 | 8/1943 | Bull | 403/339 X |
| 3,259,082 | 7/1966 | Williams | 108/152 |
| 3,695,189 | 10/1972 | Felder, Jr. | 108/65 |
| 3,822,101 | 7/1974 | Schneider | 403/401 X |
| 3,977,333 | 8/1976 | Phillips | 108/54.1 |

*Primary Examiner*—Kenneth J. Dorner
*Assistant Examiner*—José V. Chen
*Attorney, Agent, or Firm*—Polster, Polster and Lucchesi

[57] ABSTRACT

An adjustable side extension for a work table of a power tool (e.g., a direct drive table saw) is disclosed in which the side extension may be readily adjustably movable with respect to the work table so that the work surface of the work table and the side extension are general coplanar, and such that one edge of both the work table and the side extension are in line with one another. Other than the fasteners required to secure the side extension to the work table, no other loose parts, such as shims, washers, slide cam blocks or the like, are required to adjust the side extension with respect to the work table.

7 Claims, 14 Drawing Figures

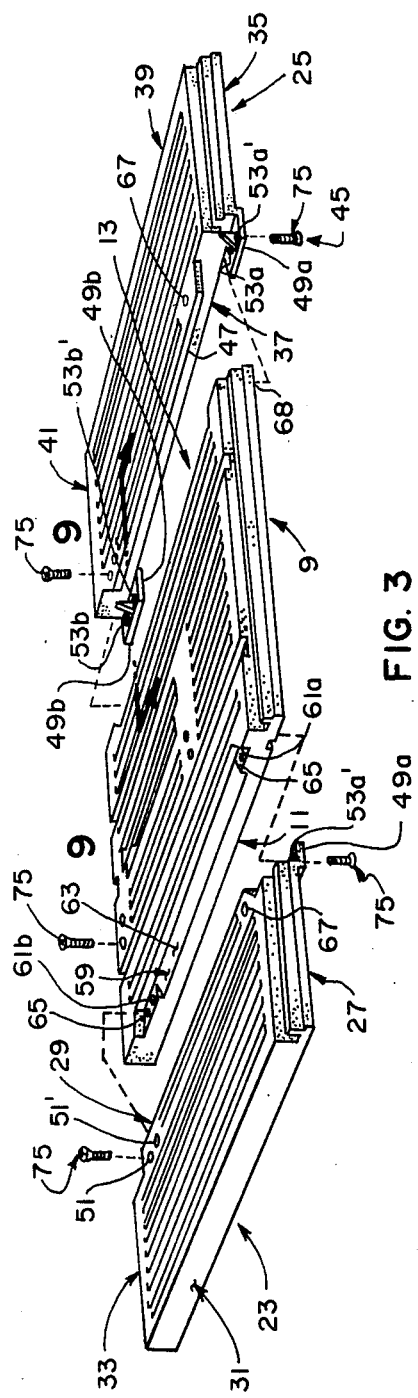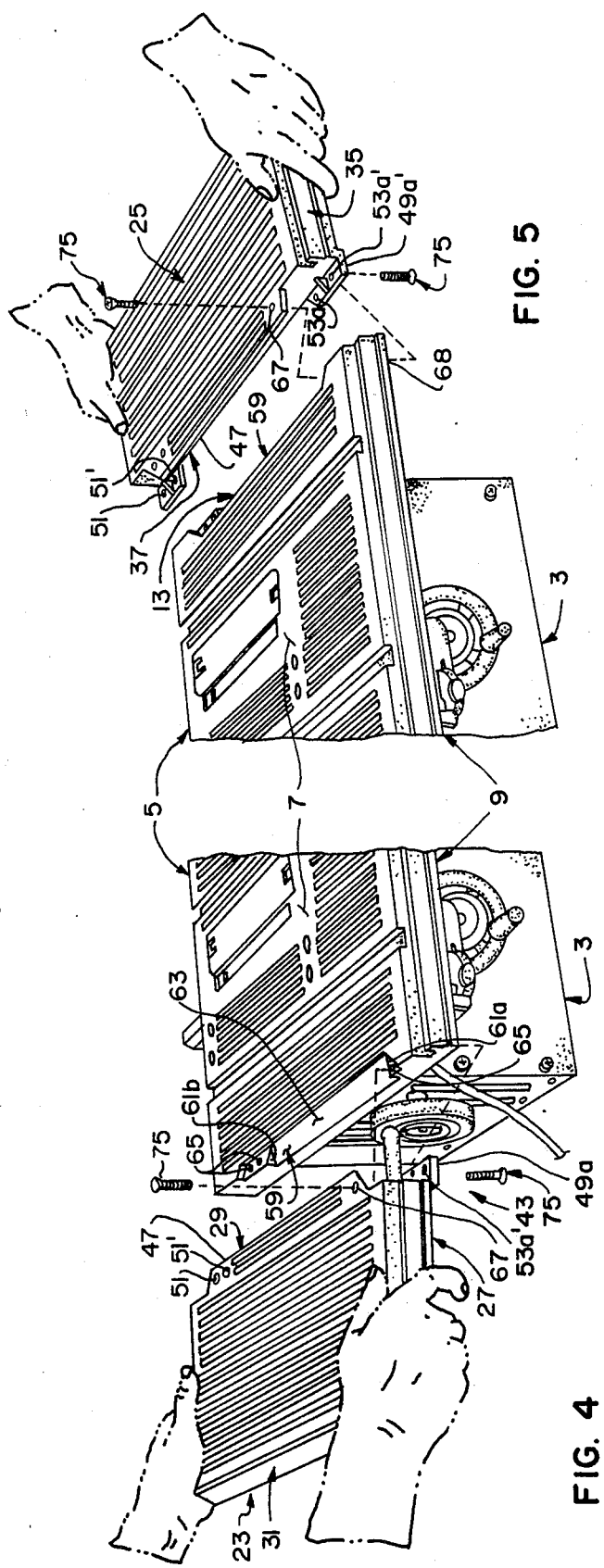

ADJUSTABLE SIDE EXTENSIONS FOR WORK TABLE

BACKGROUND OF THE INVENTION

This invention relates to a side extension which may be secured to a work table for providing a larger work surface on which a workpiece may be supported. More specifically, this invention relates to a side extension for a power tool work table, such as a direct drive table saw or the like, in which the side extension is utilized to extend the length or width of the power tool work table thereby to more readily accommodate larger size workpieces. Additionally, one edge of the side extension incorporates structure which serves as a track or a rail along which a work guide (e.g., a fence) may be slid to any desired position therealong, and such that the fence may be accurately aligned with respect to the table and the tool (e.g., the circular saw blade) of the power tool.

Heretofore, the provision of side extensions for a variety of power tools, including table saws, band saws, planers, jointers, and the like, were known. These prior work table side extensions were typically secured to the work table oy means of a plurality of fastener screws or bolts. However, it is necessary for the work surfaces of both the work table and the side extension to be coplanar such that a workpiece is uniformly supported on both the work table and on the side extension. Additionally, in a number of power tools, it is conventional to use a fence which is slidable lengthwise along a track or rail formed in one edge of the work table, with the fence serving as a reference guide along which a workpiece is moved relative to the saw blade or other tool for making accurate cuts in the workpiece. Further, side extensions have been provided which allowed the fence to be moved to a position beyond the side edge of the work table such that the fence extended over the work surface of the extension. It was a difficult matter to align the track for the fence such that the fence could readily be moved from a position in which it was overlying the work table to a position in which it would overlie the side extension. Oftentimes, such fence tracks or rails were separate from the work table or side extensions so they could be moved and aligned independently of the work table and extensions. Further, such prior art securement means for the side extension which used screw or other fasteners also utilized various brackets and shims, such that the work surface of the side extension could be aligned so as to be coplanar with the work table surface, and such that the edges of the side extension could be aligned so as to be square with respect to the work table. The requirement of a plurality of fasteners, brackets, and shims added appreciably to the complexity of installing and adjusting the side extensions relative to the work table. Additionally, it was sometimes difficult to ensure a rigid connection between the work table and the side extension with the side extension in its desired adjusted position relative to the work table when these prior securement systems were used.

SUMMARY OF THE INVENTION

Among the several objects and features of the present invention may be noted the provision of a side extension for a work table or the like (particularly the work table of a power tool) in which the side extension may be relatively easily adjusted relative to the work table to an infinite number of positions within a limited range, with the side extension being adjustable in five degrees of freedom relative to the work table (i.e., in elevation relative to the work table, in translation toward and away from the side of the work table, in translation from end-to-end of the work table, in rotation generally in the plane of the work table, and in rotation about an axis generally parallel to the side of the work table);

The provision of such a mounting system which eliminates the requirement of shims or brackets, and in which the side extension may be secured to the work table in any desired adjusted position within a limited range merely by tightening a plurality of fastening screws;

The provision of such a side attachment securement system which does not interfere with the operation of the power tool, which does not protrude above the work surface of the work table or the work surface, and which does not interfere with the movement of a fence or other guide along either the work table or the side extension;

The provision of such a side extension securement system in which the side extension may be readily adjusted so that the work surface of the side extension is coplanar with the work surface of the work table, and such that track means integrally formed along one edge of the side extension is generally in line with similar track means formed along a corresponding edge of the work table; and The provision of such a side extension securement system which may be readily incorporated in both the work table and the side extension with little or no additional manufacturing costs, which is of rugged construction, which is easy to use and to adjust, and which rigidly secures the side extension to the work table and which maintains the side extension in its desired position relative to the work table during operation of the power tool.

Other objects and features of the present invention will be in part apparent and in part pointed out hereinafter.

Briefly stated, an adjustable side extension of the present invention for a work table is disclosed. The work table has at least one side and one end, and the side extension has at least one side and one end, with the sides of the work table and the side of the side extension being generally in side-to-side abutting relation, and with the ends of the work table and the end of the side extension being generally in line with one another. Means is provided for permitting adjustment of the side extension with respect to the work table and for securing the side extension to the work table such that the upper surfaces of the work table and the side extension are substantially coplanar, and such that the ends of the work table and the side extension are generally in line with one another. This last mentioned means comprises an upper flange and a lower flange on the side of the side extension, with each of these flanges having a pair of apertures therein. Each of the last stated apertures has a first aperture side and a second aperture side generally parallel to the above-mentioned side of the side extension. The work table has a threaded opening therein in register with each of the apertures in the upper and lower side extension flanges when the side extension is in generally side-to-side abutting relation with the work table. A flathead threaded fastener having a beveled head is installed in each of the apertures in the upper and lower flanges of the side extension, and these fasteners are threadably received in a respective threaded opening in the work table. The first aperture side of each aperture is inclined with respect to the vertical at a first angle. The first aperture side of one of the apertures of each pair is disposed away from the side of the side extension, and the first aperture side of the other aperture of this aperture pair is disposed toward the side of the side extension such that the side extension can be readily moved with respect to the work table to a desired position, and such that upon the fasteners received in the pair of apertures being tightened, the heads thereof engaging the first aperture sides of their respective flange apertures so as to positively secure the side extension to the work table in its desired adjusted position.

BRIEF DESCRIPTION OF THE DRAWINGS

FIG. 3 is a perspective, exploded view of the work table, a pair of side extensions, and the system of this invention for mounting the side extensions on the work table;

FIG. 4 is a perspective view of a portion of the table saw, illustrating the manner in which the left side extension (as viewed from the front of the table saw) is mounted on the table saw;

FIG. 5 is a view similar to FIG. 4, illustrating the system for mounting the right side extension;

Corresponding reference characters indicate corresponding parts throughout the several views of the drawings.

DESCRIPTION OF A PREFERRED EMBODIMENT

Figure 1:
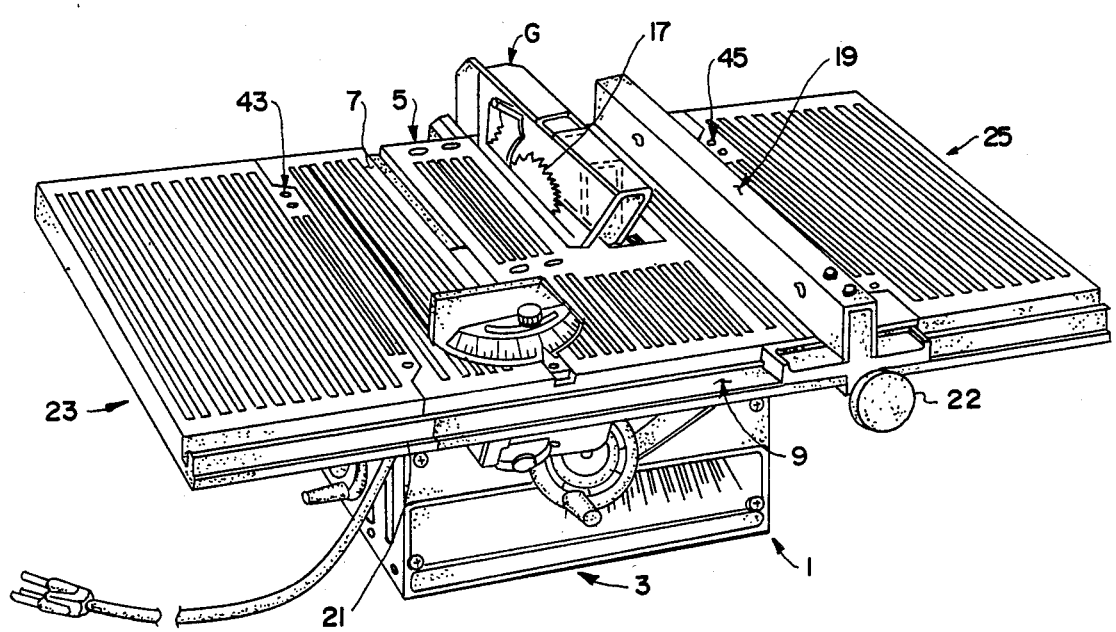
FIG. 1 is a perspective view of a power tool (e.g., a direct drive table saw) having a work table, with side extensions secured to the work table in accordance with this invention.
Figure 2:
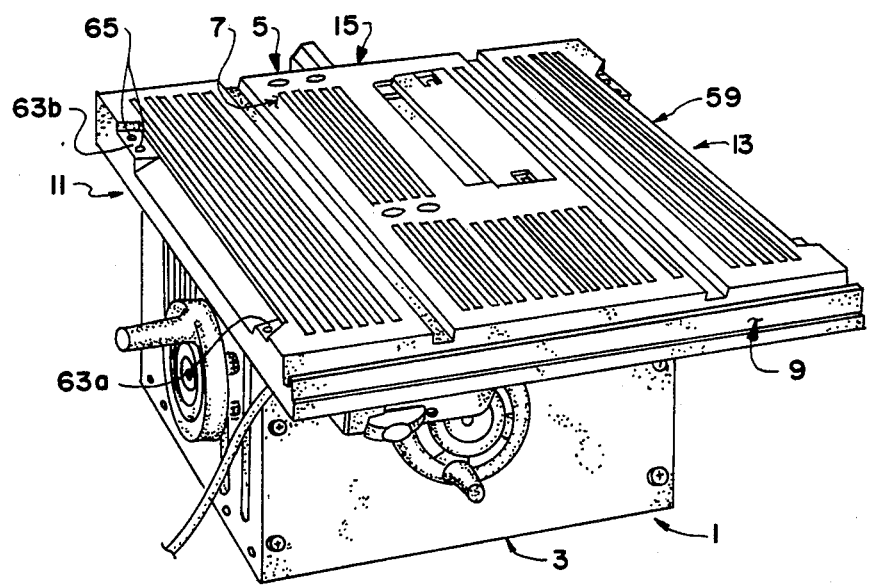
FIG. 2 is a perspective view of the table saw shown in FIG. 1, with the side extensions removed so as to illustrate portions of the system of the present invention for mounting the side extensions on the work table.

Referring now to the drawings, a power tool, and more particularly a direct drive table saw, is indicated in its entirety by reference character 1. Table saw 1 is shown to comprise a base cabinet 3, which is intended to be mounted on a work bench or on a set of support legs (neither of which are illustrated). A work table 5 of rigid die cast metal construction or the like, having a planar upper work surface 7, is rigidly mounted on base cabinet 3. Work table 5 has a front edge 9, a left side edge 11 (as viewed in FIG. 2), a right side edge 13, and a back edge 15. A tool or circular saw blade 17 (see FIG. 1) is mounted within base cabinet 5 and is driven by a suitable motor (not shown) for making cuts (or for performing other work) on a workpiece (not shown) which is moved on work table work surface 7 relative to the saw blade. As is conventional, a guard G at least partially encloses the blade. A fence or guide, as generally indicated at 19, is positioned relative to the saw blade and permits a workpiece to be moved along the fence or guide so that the saw blade makes a cut along a desired line, with the fence fixing the position of the workpiece relative to the saw blade as the workpiece is moved past the saw blade. As is conventional, fence 19 may be moved laterally with respect to saw blade 17, and the fence is mounted on a track or rail 21 formed integrally on front edge 9 of work table 5. It will be noted that on many prior art saws, such fence rails were separate members so that they could be aligned relative to the saw blade independent of table tolerances. The fence is provided with a locking screw 22 for positively fixing the position of fence 19 in any desired position along fence rail 21.

The size of the work table work surface 7 may be increased by adding a left side extension, as generally indicated at 23, and a right side extension 25. These extensions extend the size of work table 5 and permit larger workpieces to be readily supported on the working surface of the work table such that the workpiece can be conveniently moved past the saw blade, and such that it is adequately supported for making accurate cuts.

As best shown in FIGS. 3-5, left side extension 23 and right extension 25 are integrally die cast of a suitable metal alloy, such as aluminum. However, within the broader aspects of this invention, both work table 5 and side extensions 23 and 25 may be made of any suitable material, including a variety of metal alloys and synthetic resin materials.

More specifically, left side extension 23 has a front edge 27 which is configured similarly to work table front edge 9 in that the front edge of the left side extension constitutes an extension of fence rail or track 21. Further, the left side extension includes an inside edge 29 adapted to be in side-to-side abutting relation with left side edge 11 of work table 5. Still further, the left side extension includes an outside edge 31 and a back edge 33. The right side extension is generally a mirror image of the left side extension, and has an integral front edge 35 configured to be a side extension of fence rail 21. The right side extension has an inside side 37 adapted to be in side-to-side abutting relation with right side 13 of work table 5. The right side extension further has an outside edge 39 and a back edge 41.

In accordance with this invention, means, as generally indicated at 43, is provided for adjustably securing left side extension 23 to the left side edge 11 of work table 5 in side-to-side abutting relation with the work table being adjustable, within a limited range, in five degrees of freedom of movement relative to the work table thereby to permit alignment of the work table surface 7 and the top surface of the left side extension to be substantially coplanar with one another, and to permit the left side extension front edge 27 to be generally in line with the front edge 9 of the work table. Likewise, similar securing means, as indicated generally at 45, is provided for mounting the right side extension 25 to the right side edge 13 of work table 5. Since mounting means 43 and 45 are substantially identical in construction and use, only means 45 for mounting the right side extension 25 to the right side 13 of work table 5 will be described in detail. However, those skilled in the art will recognize that mean 43 for mounting the left side extension to the left side of the work table is essentially identical, only with the parts being of reverse orientation such as to account for differences between right-hand and lefthand parts.

Figure 10:
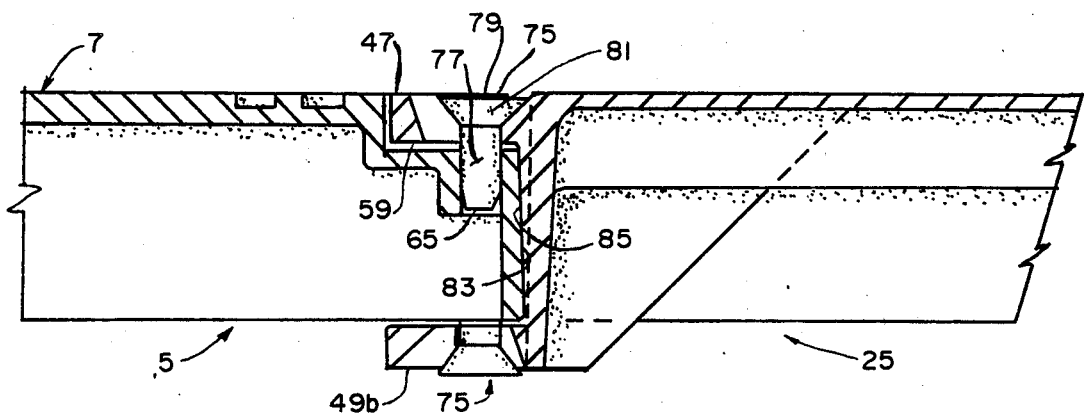
FIG. 10 is a view similar to FIG. 9, with the side extension in side-to-side abutting relation with the work table.

More particularly, right side extension 25 includes an upper flange 47 which is located generally centrally along inside edge 37 of the right side extension 25, and which terminates short of the ends of the inside edge thereof. Further, a pair of lower flanges, as indicated at 49a, 49b, is provided at the ends of the inside edge 37 proximate the front and rear edges 35 and 41 of the right side extension. As best shown in FIG. 10, the upper flange 47 is disposed to overlie a portion of work table 5, and the upper surface of the flange is generally coplanar with the upper surface of the side extension. The lower flanges 49a and 49b have an upper face which is intended to be in close proximity to the lower portion of the work table 5.

Figure 6:
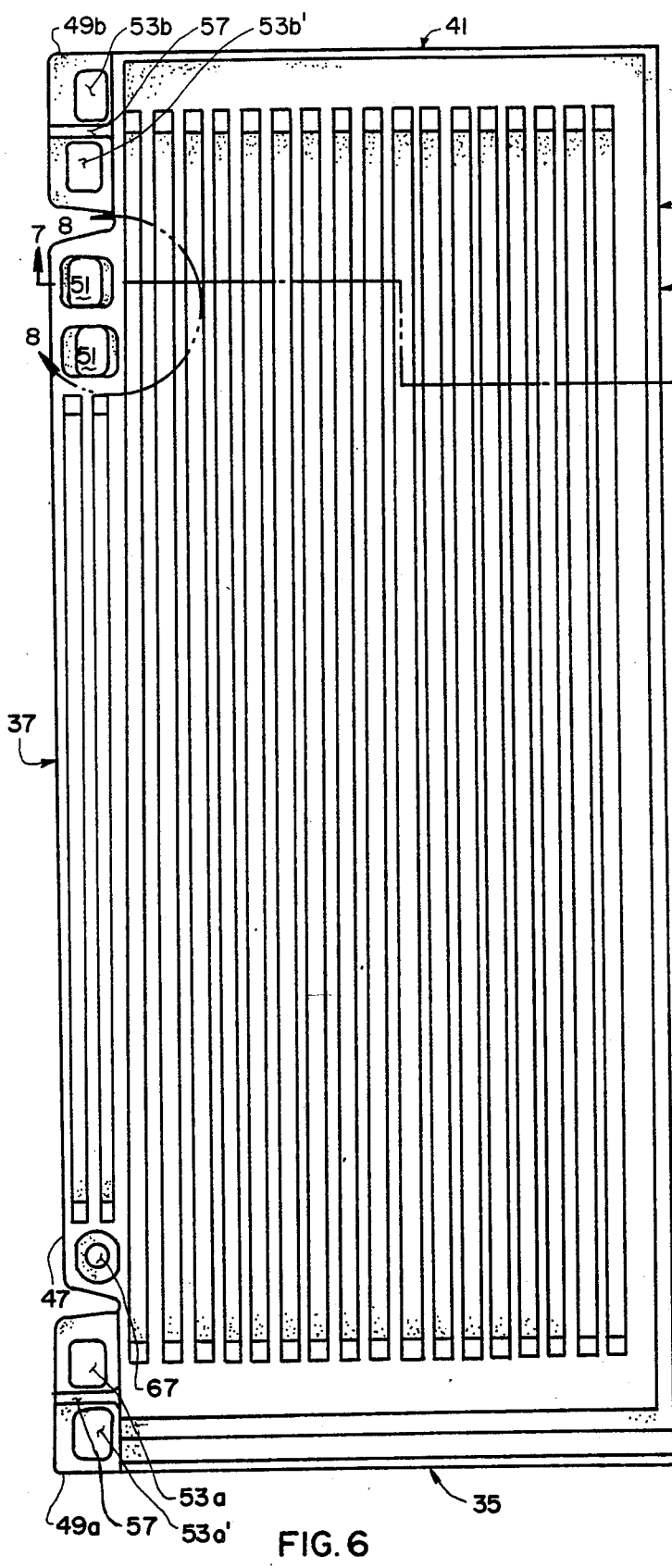
FIG. 6 is a top plan view, on an enlarged scale, of the right side extension.

At one end of upper flange 47, a pair of upper flange apertures 51 and 51' is provided. Similar pairs of flange apertures 53a, 53a' and 53b, 53b' are provided in each of the lower flanges 49a and 49b, respectively. It will be appreciated that these upper and lower flange apertures are of generally similar configuration, as will be hereinafter described in greater detail, but are oriented opposite to one another (see FIGS. 6 and 8) for purposes as will appear. The underside of upper flange 47 is reinforced by a plurality of generally vertical, tapered upper flange reinforcement ribs 55 (see FIG. 9), and each of the lower flanges is reinforced by a tapered lower flange rib 57, disposed generally between each pair of lower flange apertures 53a, 53a' and 53b, 53b'.

As best shown in FIGS. 3-5, an elongate recess, as generally indicated at 59, is provided in each side 11 and 13 of work table 5 for receiving the upper flange 47 of its respective side extension 23 and 25. Generally, recess 59 is located centrally along each side 11 and 13 of the work table. The recess has a horizontal shoulder, 61a, 61b at each end thereof, and an inclined face or shoulder 63 located between the horizontal shoulders 61a, 61b. Inclined shoulder 63 is inclined at an angle relative to the horizontal somewhat greater than the slope of upper flange reinforcement ribs 55 such that there is a small clearance between inclined shoulder 63 and the lower edges of reinforcement ribs 55. A pair of threaded openings, each of which is indicated at 65, is provided in each of the horizontal shoulders (e.g., 61b), and a single threaded opening 65 is provided in the other horizontal shoulder 61a. The pair of threaded openings 65 in shoulder 61a is generally in register with the pair of upper flange apertures 51, 51' at one end of upper flange 47. The other threaded opening 65 in shoulder 61b is in register with another upper flange opening 67, which is generally an elongate countersunk opening, somewhat longer in the direction of side 29 than it is wide and having tapered or beveled side walls. Likewise, threaded openings 68 (see FIGS. 4, 9, and 10) are provided in the bottom face of work table 5 for receiving threaded fasteners, as will be hereinafter described, inserted in the lower flange apertures 53a, 53a' and 53b, 53b'.

Figure 8:
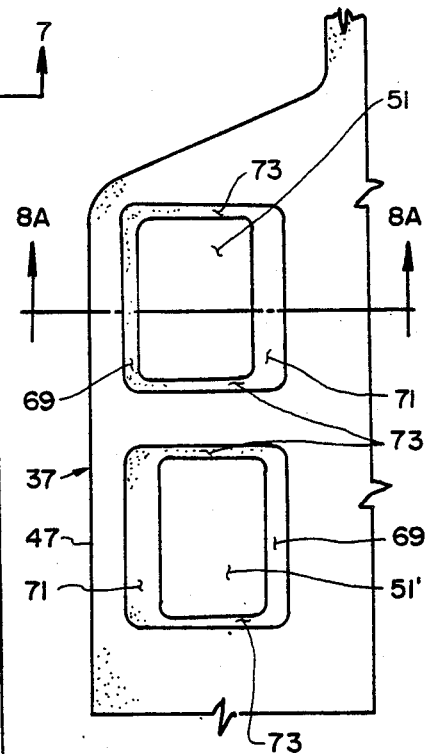
FIG. 8 is an enlarged view of a portion of the upper flange of the side extension shown in FIG. 6, illustrating details of the upper flange apertures utilized to, at least in part, mount the side extension on the work table.
Figure 8A:
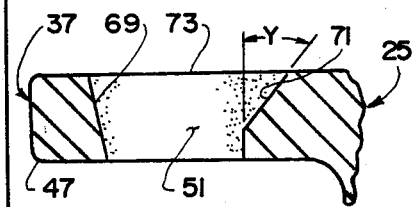
FIG. 8A is a cross sectional view, taken along line 8A—8A of FIG. 8.
Figure 7:
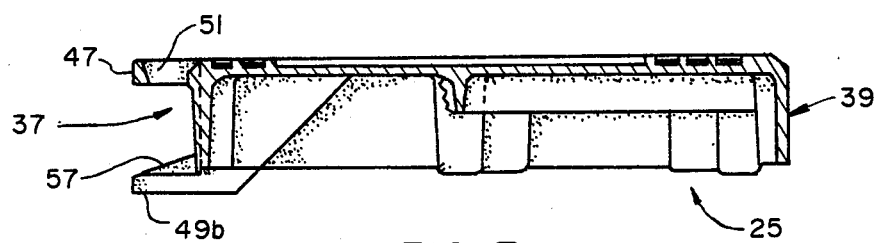
FIG. 7 is a vertical cross sectional view, taken along line 7—7 of FIG. 6.

Referring now to FIGS. 6-10, upper flange apertures 51 and 51' (and lower flange apertures 53a, 53a' and 53b, 53b') each have a first side wall 69 inclined with respect to the vertical. Further, each of these apertures has a second side wall 71 inclined with respect to the vertical at an acute angle, as indicated at Y. It will be noted that angle Y is preferably coincident with the tapered shoulder 81 of flathead screw 75, as will be hereinafter described. Further, at each end of the aperture, an end wall 73 is provided, with each of these end walls having a slight draft or taper. In FIG. 8, it will be noted that the second inclined side wall 71 of opening 51 is disposed at one side of opening 51 (i.e., at the outside of the opening), while this second side wall 71 of the opening 51' is located on the opposite side of its respective opening (i.e., on the inside face of the opening). The same reverse orientation of the openings 53a, 53a' and 53b, 53b' for the lower flanges 49a and 49b, respectively, is present. In other words, the side walls 71 which are engaged by the beveled shoulders of screws 75 for each pair of apertures 51, 51' and 53a, 53a' and 53b, 53b' face in opposite directions.

Flathead screw or other threaded fastener 75 is intended to be inserted in each of the upper flange apertures 51, 51', and 67, and is further intended to be inserted in each of the lower flange apertures 53a, 53a' and 53b, 53b'. Each of these flathead screws 75 includes a threaded shank 77 adapted to be threadably received within threaded openings 65 in horizontal shoulders 61a, 61b of work table 5, and into threaded openings 68 on the underside of the work table. Further, flathead screw 75 includes a head 79 having an appropriate slot or socket (not shown) therein so as to receive a suitable tool (e.g., a screwdriver or allen wrench) to permit rotation of the screw for installation, tightening, and removal purposes. Screw head 79 includes a tapered shoulder 81 which is disposed to bear against the inclined face 71 of its respective flange aperture 51, 51' or 53a, 53a', or 53b, 53b' thereby to positively locate its respective upper or lower flange 47, 49a, or 49b to and adjacent to horizontal surface work table 5.

Figure 9:
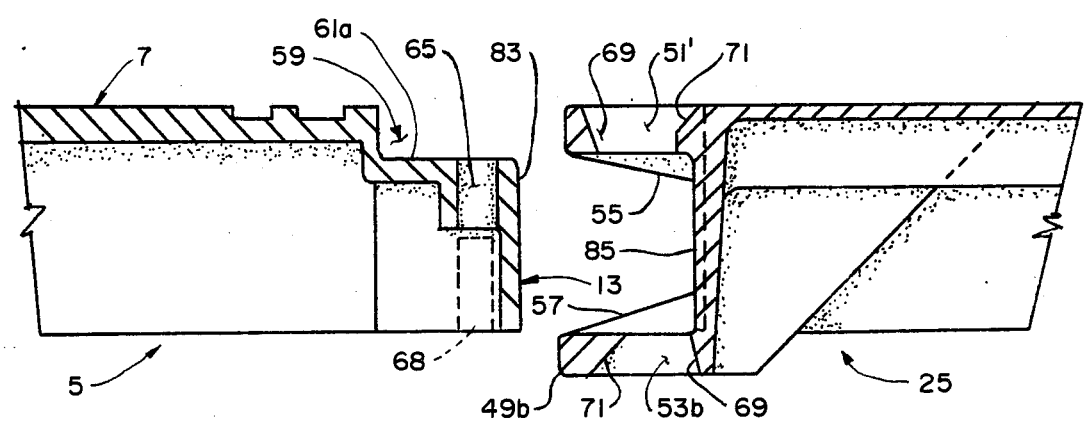
FIG. 9 is a vertical cross sectional view on an enlarged scale taken along line 9—9 of FIG. 3, illustrating the rear portions of the work table and the right side extension in an exploded view.

As best shown in FIG. 9, and further in accordance with this invention, side edges 11 and 13 of work table 5 include an inclined face 83 angled at a slight degree (e.g., ranging between about five and fifteen degrees) relative to the vertical, with the upper edge of the side 11 or 13 being spaced inwardly of the work table away from a vertical line tangent to the bottom of the work table side. Correspondingly, the side edges 29 and 37 of the left and right side extensions 23 and 25, respectively, are inclined at a similar inclined angle with respect to the vertical, with these inclined side faces being indicated at reference character 85. In this manner, the inclined faces 83 of work table sides 11 and 13, and the inclined side faces 29 and 37 of the side extensions are generally in inclined, face-to-face abutting engagement (see FIG. 10) when the side extensions are moved inwardly toward the work table. It will be appreciated that by raising the side extensions relative to the work table in such manner as to maintain these inclined side faces 83 and 85 in face-to-face abutting relation, the side extensions 23 or 25 will be elevated (raised or lowered) relative to the work table work surface 7, as generally indicated by the vertical arrow in FIG. 13. However, within the broader aspects of this invention, these inclined side faces 83 and 85 need not be in face-to-face abutting relation so as to effect raising and lowering of the side extension relative to the work table.

Figure 11:
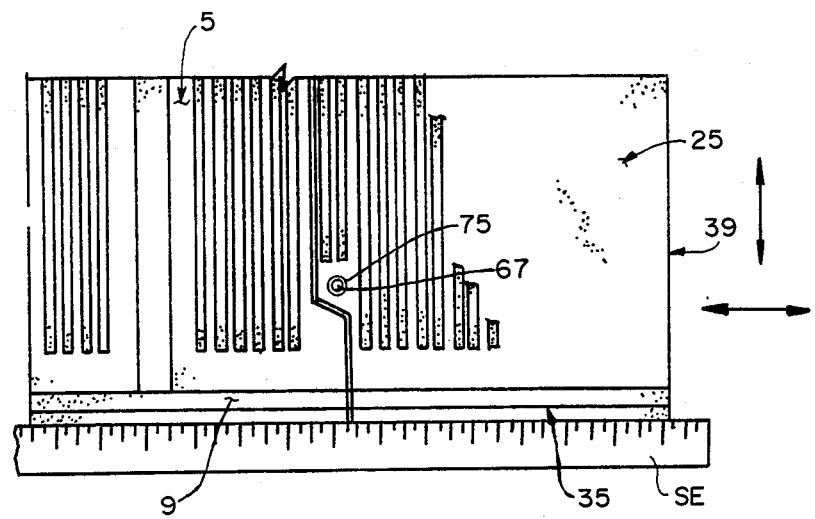
FIGS. 11-13 illustrate the righthand portion of the work table and the right side extension, as they are mounted together, and illustrate the system of this invention for permitting five degrees of freedom of movement of the side extension relative to the work table (on an exaggerated scale) thereby to permit the ready adjustment and securement of the side extension relative to the work table such that the work surfaces of the work table and the side extension are coplanar, and such that the front edges of the work table and the side extension are in line with one another so that the guide fence may be run therealong, and so that the guide fence may accurately guide work past the saw blade of the saw.

Further, with screws 75 installed in their respective upper and lower flange apertures, as best illustrated in FIGS. 2-5 and in FIG. 10, and with the screws not fully tightened, it is possible to shift the side extensions 23 or 25 in front-to-back relation relative to work table 5 (as indicated by the arrows in FIG. 11 parallel to side edge 39) such that the front edge 35 of side extension 25 is generally in line with front edge 9 of work table 5, thus ensuring that the fence rails or tracks on both front edge 9 and on front edge 35 are in line with one another so that fence 19 may be readily moved along both the front edge of the work table and the front edge of the side extension. This front-to-rear movement of the side extension with respect to the work table is possible because the upper and lower flange openings or apertures 51a, 51', and the lower flange apertures 53a, 53a' and 53b, 53b', are considerably longer than the diameter of screw shank 77. Additionally, it will be understood that recesses 59 provided along the side edges 11 and 13 of table 5 are somewhat longer than the respective upper flanges 47 of the side extensions received therein. Also, the elongate screw opening 67 in upper flange 47 of each of the side extensions is somewhat longer than the diameter of screw shank 77, and thus the side extension may be moved in generally horizontal fore and aft direction with respect to the work table. Likewise, each of the above-mentioned upper and lower flange openings or apertures 51, 51', or 53a, 53a', or 53b, 53b' is somewhat wider than the diameter of the screw shank 77 such that the side extension may be moved in horizontal direction (as shown by the arrows in FIG. 11 parallel to front edge 35) toward and away from the side edges 11 and 13 of work table 5.

Figure 12:
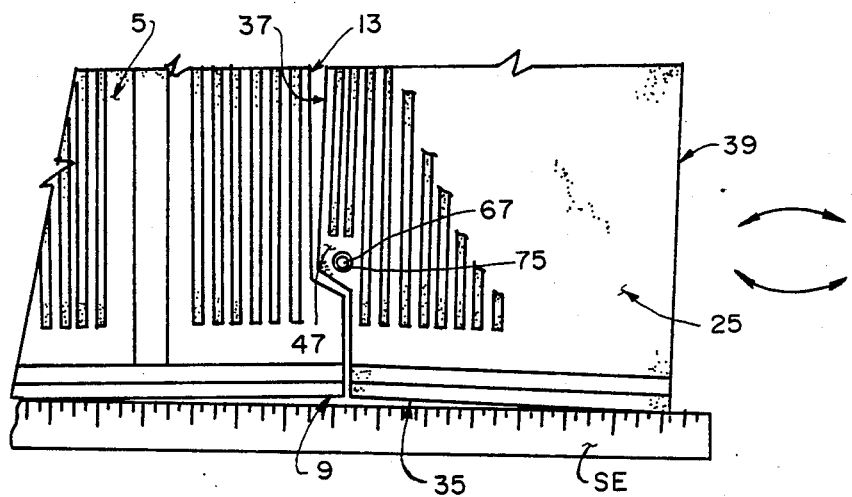

Still further, because the upper and lower flange apertures or openings are somewhat larger than screw shank 77, and because recess 59 is somewhat larger than upper flange 47, each side extension 23 or 25 may be rotated in a generally horizontal plane relative to work table 5, as indicated by the arcuate arrows in FIG. 12. This rotational movement of the side extensions further permits alignment of the front edge 37 of each side extension so as to be generally in line with the front edge 9 of the work table, as may be readily checked by laying a straightedge SE along the front edges 27, 9, and 35 of the left side extension, work table, and right side extension, respectively.

Figure 13:
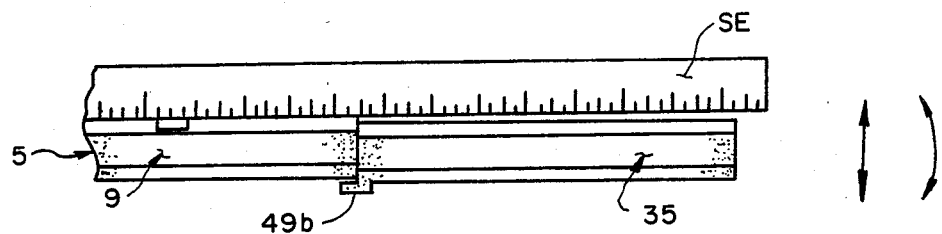

Additionally, as shown in FIG. 13, because of the inclined faces 83 and 85 of side faces 11 and 13 of work table 5 and of inside faces 29 and 37 of the left and right side extensions 23 and 25, respectively, and because screws 75 have not yet been tightened against the side walls 71 of their respective flange aperture openings 51, 51' or 53a, 53a', or 53b, 53b', or against the elongate countersunk sides of opening 67, it is possible to elevate (i.e., raise and lower) the side extensions relative to the work table, as indicated by the vertical arrows in FIG. 13. It will also be appreciated that it is possible to rotate the side extensions about an axis generally parallel to the inside side edges 29 and 37 of each of the side extensions so as to adjust the upper surface of the side extensions to be generally coplanar with work table surface 7, this rotational movement being indicated by the arcuate arrow in FIG. 13. In this manner, it will be appreciated that five degrees of freedom of movement of the side extensions relative to the work table is possible.

Also, in accordance with this invention, and with the side extensions secured to the work table merely by means of a plurality of flathead screws 75, and with the flathead screws not securely tightened against adjacent sides of their respective flange openings or apertures, each of the side extensions 23 or 25 may be independently adjusted in any one of the above-mentioned five degrees of freedom so that the plane of the side extension work surface is generally coplanar with work table surface 7, and further such that the front edges 27 and 35 of each of the side extensions is generally in line with front edge 9 of work table 5. Once each of the side extensions have been properly positioned relative to the work table, each of the screws 75 may be securely tighetened within its respective aperture thereby to positively secure and to rigidly mount each of the side extensions relative to the work table in its desired adjusted position. It will further be noted that this adjustment may be carried out utilizing only the flathead screws without the provision of additional brackets or shims, as heretofore required. It will be further appreciated that the only points at which the side extensions are firmly clamped to the work table are the contact between the beveled screw heads 81 bearing on inclined aperture faces 71 of the upper apertures 51, 51' and 67, and the lower apertures 53a, 53a' and 53b, 53b'. It is not necessary that any other portions of the side extensions contact the work table. However, depending on the position of the side extension to the work table, such other contact points may result.

In view of the above, it will be seen that the other objects of this invention are achieved and other advantageous results obtained.

As various changes could be made in the above constructions without departing from the scope of the invention, it is intended that all matter contained in the above description or shown in the accompanying drawing shall be interpreted as illustrative and not in a limiting sense.

What is claimed is:

1. An adjustable side extension for a work table, the latter having an upper surface and at least one side and one end, and the side extension having an upper surface and at least one side and one end, with the side of the work table and the side of the side extension being generally in side-to-side relation, and means for permitting adjustment of the side extension with respect to the work table and for securing the side extension relative to the work table such that the upper surfaces of the work table and the side extension are substantially coplanar and such that the end of the work table and the end of the side extension are generally in line with one another, said means comprising an upper flange and a lowr flange carried by said side extension, each of said flanges having an aperture therein, each said aperture having an aperture side generally parallel to the side of said side extension, said work table having a threaded opening therein in register with each of said apertures in said side extension when said side extension is in generally side-to-side relation with said work table, a threaded fastener received in each of said apertures and being threadably received in a respective said threaded opening in said work table, said aperture side being inclined with respect to the vertical, said aperture side of said upper flange aperture and said aperture side of said lower flange aperture facing in opposite directions with respect to one another such that said side extension can be moved both in vertical and horizontal direction with respect to said work table to a desired position, and such that upon tightening of said fasteners, said fasteners engage their respective said aperture sides of their respective apertures thereby to positively secure said side extension to said work table in its desired vertical and horizontal adjusted position with respect to said work table.

2. An adjustable side extension as set forth in claim 1 wherein said upper flange has two of said upper flange apertures therein, with said upper flange apertures having their aperture sides facing in opposite directions with respect to one another.

3. An adjustable side extension as set forth in claim 2 wherein said lower flange means has two of said lower flange apertures therein, with said lower flange apertures having their said aperture sides facing in opposite directions with respect to one another.

4. An adjustable side extension as set forth in claim 1 wherein said side extensions has a pair of said lower flanges, one positioned generally at each end of said side of said side extension.

5. An adjustable side extension as set forth in claim 4 wherein said side extension upper flange is an elongate flange located generally centrally of said side of said side extension, said upper flange having an upper surface generally coplanar with the upper surface of said side extension, said work table having a recess along its said side for receiving said upper flange of said side extension.

6. An adjustable side extension as set forth in claim 5 wherein at one end of said upper flange of said side extension, a pair of said upper flange apertures is provided, and at the other end of said upper flange, an elongate countersunk opening is provided, said upper flange apertures and said countersunk opening each receiving a respective flathead threaded fastener, said countersunk opening having beveled side and end walls thereof, and said upper flange apertures being generally larger than the cross section of said flathead fasteners thereby permitting relative movement of the side extension relative to the work table in horizontal direction when said flathead screws are loosened.

7. An adjustable side extension for a work table, the latter having at least one side, at least one end, and a planar work surface, said side extension having a side for side-to-side abutting relation with said side of said work table and a planar extension work surface, said side extension having an end for being generally in line with said work table end, and means for adjustably mounting said side extension on said work table with the work surfaces of said work table and said side extension being substantially coplanar, with the side of the work table and the side extension being substantially in side-to-side abutting relation, and with the end of the work table and the end of the side extension being generally in line with one another, one of said sides having an upper flange projecting outwardly therefrom, said upper flange having a first opening therethrough for receiving a first threaded fastener, said other side having a first threaded aperture therein for threadably receiving said first fastener, said one side further having at least one lower flange projecting outwardly therefrom, said lower flange having a second aperture therein, said other side having a second opening therein for threadably receiving a second threaded fastener received in said second aperture, said first and second fasteners each being a screw having a shank and a head with the head being beveled, each of said first and second apertures in said upper and lower flanges being generally rectangular and having a pair of opposed sides, each said aperture having a width and length greater than the maximum diameter of said head of said first and said second fasteners, one of said sides of said apertures being inclined at a first angle with respect to the vertical, and with said inclined side of the first aperture of the upper flange being on the side of the first aperture away from said work table, and with said inclined side of the second aperture being on the side of said second aperture toward side work table so that upon moving said side extension toward and away from its adjacent side of said work table, the heads of said fasteners received in said first and said second apertures upon tightening thereof firmly bear against a respective said one side of said first and second apertures thereby to prevent movement of the side extension with respect to the work table.

* * * * *